US005969925A

United States Patent [19]

Nilssen

[11] Patent Number: 5,969,925

[45] Date of Patent: *Oct. 19, 1999

[54] FIRE-INITIATION-PROTECTED POWER DISTRIBUTION SYSTEM

[76] Inventor: Ole K. Nilssen, 408 Caesar Dr., Barrington, Ill. 60010

[ * ] Notice: Under 35 U.S.C. 154(b), the term of this patent shall be extended for 1023 days.

[21] Appl. No.: 08/488,171

[22] Filed: Jun. 12, 1995

Related U.S. Application Data

[63] Continuation-in-part of application No. 07/886,313, May 22, 1992, abandoned, which is a continuation of application No. 07/512,572, Apr. 9, 1990, abandoned, which is a continuation of application No. 06/773,066, Sep. 6, 1985, abandoned.

[51] Int. Cl.[6] ....................... H02H 3/18

[52] U.S. Cl. ....................... 361/79; 361/65; 361/66; 361/44; 361/45

[58] Field of Search ....................... 361/36, 44, 45, 361/63, 64, 65, 66, 79

[56] References Cited

U.S. PATENT DOCUMENTS 3,764,993 10/1973 Staad et al. .
4,159,466 6/1979 Bereskin .

OTHER PUBLICATIONS

Mason, Protective Relaying, John Wiley & Sons Inc., 1956, pp. 63–69, 287–288.

*Primary Examiner*—Michael J. Sherry

[57] ABSTRACT

An arrangement for transmitting electric power from a source point to a load point comprises (i) a first sensor to monitor the amount of power being supplied from the source point, (ii) a second sensor to monitor the amount of power being received by the load point, and (iii) communication circuit for communicating to a control circuit information in respect to the amount of power supplied from the source point as well as that received by the load point. The control circuit then compares the amount of power supplied versus that received, and provides a warning and/or halts the supply of power in case a substantive discrepancy were to occur between power supplied versus power received. Thus, in case an improper loading were to occur between the source point and the load point, it would be detected by the control circuit, which would then instigate protective action.

11 Claims, 1 Drawing Sheet

FIRE-INITIATION-PROTECTED POWER DISTRIBUTION SYSTEM

RELATED APPLICATIONS

The present application is a Continuation-in-Part of Ser. No. 07/886,313 filed May 22, 1992, now abandoned; which is a Continuation of Ser. No. 07/512,572 filed Apr. 9, 1990, now abandoned; which is a Continuation of Ser. No. 06/773,066, Sep. 6, 1985 now abandoned.

BACKGROUND OF THE INVENTION

1. Field of Invention

The present invention relates to electronic protection means in a system for transmitting electric power.

2. Prior Art

Within a building, in order to reduce fire initiation hazard, it is presently common practice to transmit electric power by way of power cables placed inside protective conduits. That way, chances of accidental damage to the power cables are minimized. Moreover, any spark, flame and/or heat generation that might occur in connection with the power cables would be contained and/or mitigated by the conduit.

Outside buildings, electric power is commonly transmitted by way of overhead power lines; and, not infrequently, is happens that a power line breaks, falls to ground, and establishes an arc that may give rise to substantial damage—yet, the power drawn by the arc is not necessarily high enough to cause the upstream circuit breaker to open.

SUMMARY OF THE INVENTION

BRIEF DESCRIPTION

In its most basic preferred embodiment, subject invention constitutes an arrangement for transmitting electric power from a source point to a load point. This arrangement comprises:

(a) means for monitoring the amount of power being supplied from the source point;

(b) means for monitoring the amount of power being received by the load point; and (c) communication means for communicating to a control means information in respect to the power supplied from the source point as well as that received by the load point, this control means being operative to compare the amount of power supplied versus that received, and to provide a warning and/or to halt the supply of power in case a substantive discrepancy were to occur between power supplied versus power received.

Thus, in case an improper loading were to occur between the source point and the load point, it would be detected by the control means, which would then effect protective action.

In a power distribution system within a building, the communication means consists of a set of Class-2 communication wires provided alongside the electric power cables.

In an outdoor overhead power transmission system, the communication means would consist of a separate communication link between the load point and the source point.

DESCRIPTION OF THE PREFERRED EMBODIMENT

Details of Construction

Figure 1:
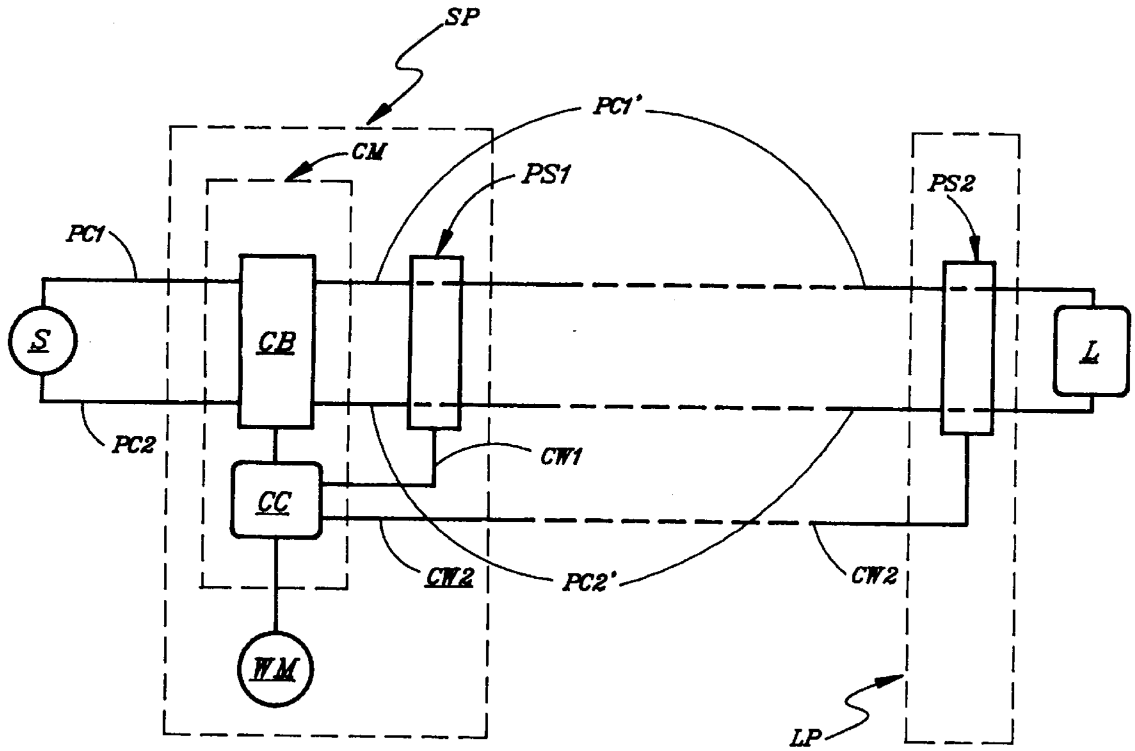
FIG. 1 schematically illustrates the most basic embodiment of the invention, where electric power is transmitted from a single source point to a single load point.

FIG. 1 shows an AC voltage source S, which is an ordinary 120 Volt/60 Hz electric utility power line. From this AC voltage source, two power conductors PC1 and PC2 provide 120 Volt/60 Hz voltage to circuit breaker CB. Corresponding to power conductors PC1 and PC2, respectively, two power conductors PC1' and PC2' emanate from circuit breaker CB and pass through a first power sensor PS1, after which the two power conductors pass through the boundary of source point SP and onward toward the boundary of load point LP. Then, the two power conductors pass through a second power sensor PS2 and connect with a load L.

A first communication wire CW1 from power sensor PS1 and a second communication wire CW2 from power sensor PS2 both connect with a computer/comparator CC; outputs from which connect with circuit breaker CB and warning means WM.

The assembly consisting of computer/comparator CC and circuit breaker CB is referred to as control means CM.

Figure 2:
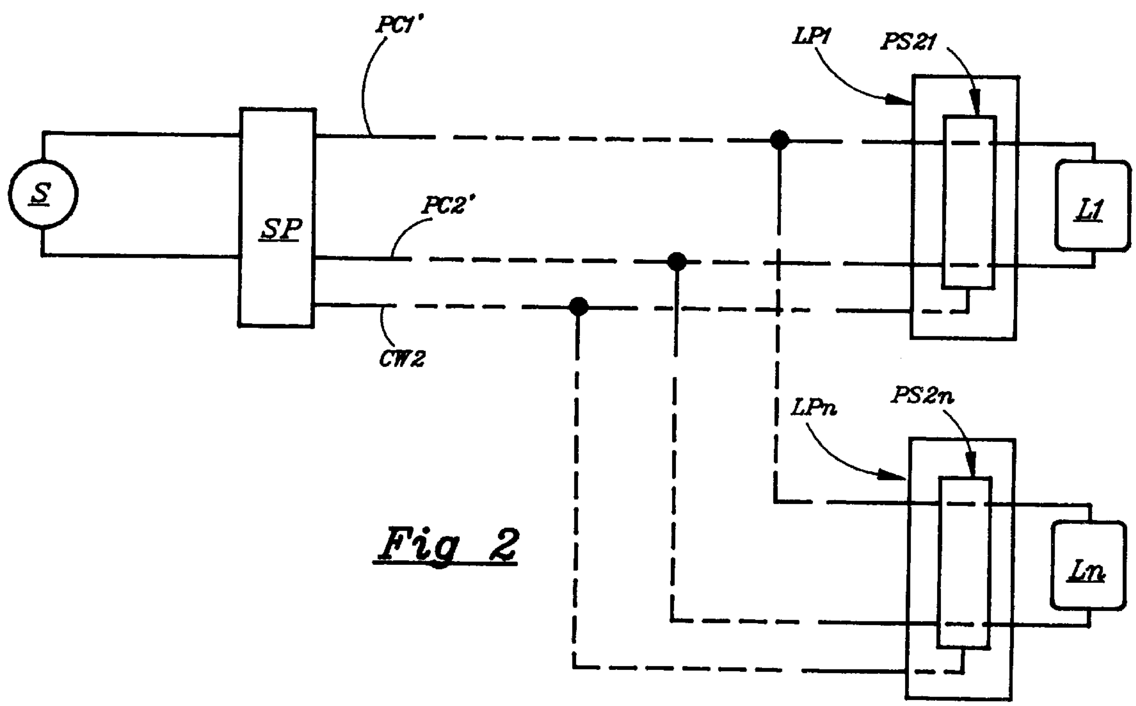
FIG. 2 schematically illustrates an embodiment where a single source point supplies power to a plurality of load points.

FIG. 2 shows an AC voltage source S and a source point SP, similar to that of FIG. 1. However, the power conductors PC1' and PC2' from source point SP now connect with plural load points LP1–LPn and then, respectively, with loads L1–Ln. Each load point, respectively, has a power sensor PS21–PS2n; all of which are connected with communication wire CW2.

Details of Operation

With reference to FIG. 1, circuit breaker CB is electrically operated and is capable of being closed and/or opened in response to electrical output from computer/comparator CC.

Warning means WM is also electrically operated and will provide for a warning signal in response to an electrical output from computer/comparator CC.

The amount of electric power being transmitted from circuit breaker CB toward load point LP is monitored by power sensor PS1; which power sensor provides an electrical output signal that is a measure of the amount of power flowing through it.

The amount of electric power being received by load L from source point SP is monitored by power sensor PS2; which power sensor provides an electrical output signal that is a measure of the amount of power flowing through it.

The output signals from power sensors PS1 and PS2 are both applied to computer/comparator CC; which then, in turn, provides an electrical output to circuit breaker CB and/or to warning means WM.

Built into the circuit breaker is a threshold means operable to prevent it from opening or breaking the circuit except if the magnitude of the output from the computer/comparator exceeds a certain pre-determined minimum. Moreover, the circuit breaker is of the latching type, which means that it will keep the circuit broken or open until it is overtly re-activated.

Similarly, built into the warning means is a threshold means operable to prevent it from providing a warning except if the magnitude of the electrical output from the computer/comparator exceeds a certain pre-determined minimum.

Thus, in an overall sense, the system of FIG. 1 operates as an auditing arrangement: the amount of power absorbed by the load point is measured and compared with the amount of power being delivered from the source point; and, if there is a substantive discrepancy, a warning is sounded and/or the delivery of power is interrupted.

In other words, in FIG. 1, if an unintended drain of electric power were to occur between the source point and the load point, a warning would be provided and/or the delivery of power would be halted.

In respect to FIG. 2, the arrangement shown there operates in substantially the same manner as does that of FIG. 1. The only difference relates to the fact that the comparator has to respond to the combination of several signals from several load points.

Comments (a) In respect to the systems of FIGS. 1 and 2, because the supply of power would be interrupted in case unintended power leakage or dissipation were to occur between a source point and a load point, there would be no need to protect the power conductors (PC1' and PC2') between source point and load point(s) by conduit or armor.

(b) In respect to the arrangement of FIG. 2, one way of providing for parallel operation of several load points is that of having power sensors PS21–PS2n each provide its output in the form of current from a current source (as opposed to a voltage from a voltage source). Then, by arranging for the comparator to represent a fixed impedance loading to communication wire CW2 (which in this case is assumed to consist of a pair of wires), the magnitude of the voltage resulting across this fixed impedance loading would represent the sum of all the currents provided by all the power sensors PS21–PS2n.

(c) Especially in connection with overhead electric transmission lines, it is anticipated that the requisite communication between the comparator and the various current sensors of the various load points may be achieved by wireless means.

(d) In the systems of FIGS. 1 and 2, the computer/comparator may be calibrated such as to account for and to disregard the power dissipated in the distribution wires, thereby providing for more accurately responsive systems.

(e) The information provided by the various power sensors may be coded, multiplexed and communicated in a variety of different ways. However, details of such coding, multiplexing and communication, as well as any corresponding computation required to be accomplished by the computer/comparator, are very well known within the arts of information processing and communications; and, since they form no part of the present invention, these details need not be provided here.

(f) It is noted that the control means CM of FIG. 1 may readily be arranged to provide the additional function of sensing and responding to an overload condition. That is, an alarm may be provided and/or the supply of power may be halted, not only in response to the presence of an unauthorized load between a source point and a load point, but also in response to an excessive flow of power from the load point—even if all the power is being received by the various load points.

(g) In respect to the power supplied from the source point versus that received by the load point(s), it is noted that the maximum discrepancy that should be permitted to exist before taking action to halt the flow of power should not exceed an amount of power that might be considered hazardous from a fire initiation viewpoint. In line with the specifications of the National Electrical Code for Class-2 and Class-3 circuits, this amount would generally be on the order of 100 Watt.

(h) By way of power sensors PS1 and PS2, the arrangement of FIG. 1 specifies the monitoring of actual power flow at the source point and the load point. However, for sake of cost-effectivity, it is anticipated that in some situations it will be sufficient to monitor just the flow of current.

(i) Provisions can readily be provided whereby control means CM of FIG. 1—after having halted the flow of power in response to some fault condition—will automatically restore the flow of power after a pre-determined time period.

Of course, if the fault condition persists, the flow of power should immediately be halted again.

(j) In respect to an electric power distribution system in a home or other building, it is anticipated that the communication links required in connection with the electric power distribution system of the present invention also be useful in connection with other communication functions, such as telephone service, etc. Conversely, an existing telephone system may provide for the requisite communication links.

(k) With reference to Section (e) hereinabove, as any person having but ordinary skill in the pertinent art would readily understand from the specification, the information provided by the various power sensors may be communicated to the computer/comparator (CC) in various different ways, including wireless transmission. However, by whatever means of communication, it is inherently necessary that the communication from each power sensor be provided to the computer/comparator by no less than two conductors—this being so for the basic reason that it takes a minimum of two conductors to convey an electrical signal.

Thus, by inherency, communication wires CW1 and CW1 each must include the equivalent of at least two electrical conductors.

{Of course, each communication wire could be an optical fiber or a waveguide. However, in instant context, each of those alternatives would represent the equivalent of a pair of conductors.}

In any case, it is especially important to notice that communication wires CW1 and CW2 do not have to carry any of the current flowing to the load L; which is to say, they don't have to carry anything other than communication signals (i.e., data or signal currents) and can therefore be made of very small size conductors.

(1) Also as any person possessing but ordinary skill in the pertinent art can see from the specification, the various power sensors (e.g., PS1, PS2) are identified as sensing the amount(of power flowing through it, not merely the magnitude of the current passing through it. By inherency and in effect, this means that each power sensor senses the real component of the product of (i) the magnitude of the current carried by the power conductors passing through it, and (ii) the magnitude of the voltage present between these power conductors at the point where they pass though the power sensor.

(m) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:

a source conditionally operative to provide a power line voltage at a pair of source terminals; the source including a circuit breaker operative, in response to an activation signal received at an activation input, to remove the power line voltage from the source terminals;

a load having a pair of load terminals and being operative to draw power when provided with a voltage across its load terminals;

a pair of power conductors having a pair of power input terminals and a pair of power output terminals; the power input terminals being connected with the source terminals; the power output terminals being connected with the load terminals;

a first sensor assembly being connected in circuit with the power conductors at or near its power input terminals; the first sensor assembly having a first sensor output and being operative to provide therefrom a first sensor output signal indicative of the amount of power flowing into the power input terminals;

a second sensor assembly being connected in circuit with the power conductors at or near its power output terminals; the second sensor assembly having a second sensor output and being operative to provide therefrom a second sensor output signal indicative of the amount of power flowing out of the power output terminals; and a comparator having a first and a second signal input, as well as an activation signal output; the first signal input being connected with the first sensor output by way of a first communication path; the second signal input being connected with the second sensor output by way of a second communication path; the activation signal output being connected with the activation input; the comparator being operative to provide said activation signal to the activation input output whenever there occurs a minimum difference between the first and the second sensor output signals; the minimum difference being defined as one that results whenever the difference between the amount of power flowing into the power input terminals exceeds the amount of power flowing out of the power output terminals by a predetermined amount.

2. The arrangement of claim 1 wherein the communication path is further characterized by being electrically separate from the power conductors.

3. In a system conditionally operative to transmit electric power from a source to a remote load; the source including a circuit breaker having an activation input and being responsive on receipt of an activation signal to prevent the source from supplying electric power; the improvement comprising:

first sensor associated with the source and operative to provide a first signal indicative of the amount of power supplied from the source;

second sensor associated with the load and operative to provide a second signal indicative of the amount of power being received by the load; and an electronic circuit connected by way of a communication path with each of said sensors; the electronic circuit having an activation output connected with the activation input and being operable to provide said activation signal in response to a predetermined minimum difference in the amount of power supplied by source and that received by said load.

4. A system for transmitting power from a source to plural loads, comprising:

a circuit breaker connected with the source and operative, in response to receiving an activation signal at an activation input, to halt the flow of power from the source;

a source sensor associated with the source and operative to provide a first signal indicative of the amount of power being supplied from the source;

a load sensor associated with each one of said plural loads and operative to provide a signal indicative of the amount of power being received by that one load;

a circuit assembly having a activation output connected with the activation input; the circuit assembly being connected, via separate communication paths, with said source sensor as well as with each of said load sensors; the circuit assembly being operative to provide said activation signal in response to a difference in the amount of power being supplied by the source and the sum total of the power received by all the plural loads.

5. The system of claim 4 wherein the load sensor is further characterized by sensing only the real power being supplied from the source while disregarding any reactive power being supplied.

6. In a building intended for human occupancy, the building receiving electric power from an ordinary electric utility power line, the electric power being received at a source point located within the building, at least part of the electric power being transmitted by way of power conductors from the source point toward a load point located within the building, the improvement comprising:

a source sensor associated with the source point and operative to provide a first signal indicative of the amount of real power being supplied from the source point;

a load sensor associated with the load point and operative to provide a second signal indicative of the amount of real power being delivered to the load point;

circuit assembly connected with the source sensor and the load sensor by way of a source signal path and a load signal path; the circuit assembly being operative to provide an activation signal output in response to the difference in the amount of real power being supplied from the source point and that being delivered to the load point; and circuit breaker connected with the source point as well as with the circuit assembly; the circuit breaker being operative to become activated by the activation signal output such as to halt the supply of real power from the source point in case the amount of real power being delivered to the load point is different from the amount of real power being supplied from the source point by more than a pre-determined amount.

7. The improvement of claim 6 wherein the predetermined amount does not exceed an amount of power considered safe from fire initiation hazard.

8. The improvement of claim 6 wherein the source signal path conveys nothing more than a sensor signal from the source sensor; the sensor signal being defined as not including load current flowing through the load.

9. The improvement of claim 6 wherein the source signal path is further characterized by not including any of the power conductors.

10. The improvement of claim 6 wherein any current flowing to the load point is carried only by the power conductors.

11. The improvement of claim 6 wherein none of any current flowing through the power conductors flows through any conductor being a part of the load signal path.

* * * * *